United States Patent
He et al.

(10) Patent No.: US 12,547,225 B2
(45) Date of Patent: Feb. 10, 2026

(54) METHOD AND APPARATUS FOR AN ENCLOSED IONIC THERMAL MODULE

(71) Applicant: Dell Products, LP, Round Rock, TX (US)

(72) Inventors: Qinghong He, Austin, TX (US); Travis C. North, Cedar Park, TX (US); Mitchell Anthony Markow, Hutto, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 578 days.

(21) Appl. No.: 17/967,389

(22) Filed: Oct. 17, 2022

(65) Prior Publication Data
US 2024/0126351 A1 Apr. 18, 2024

(51) Int. Cl.
| | | |
|---|---|---|
| G06F 1/20 | (2006.01) | |
| H01T 19/00 | (2006.01) | |
| H01T 23/00 | (2006.01) | |
| H05K 7/20 | (2006.01) | |

(52) U.S. Cl.
CPC .............. *G06F 1/203* (2013.01); *G06F 1/206* (2013.01); *H01T 19/00* (2013.01); *H01T 23/00* (2013.01); *H05K 7/20172* (2013.01); *H05K 7/20409* (2013.01); *H05K 7/20136* (2013.01); *H05K 7/20318* (2013.01)

(58) Field of Classification Search
CPC ......... G06F 1/203; G06F 1/206; H01T 19/00; H01T 23/00; H05K 7/20172; H05K 7/20409; H05K 7/20136; H05K 7/20318; F24F 8/30
See application file for complete search history.

(56) References Cited

U.S. PATENT DOCUMENTS

| | | |
|---|---|---|
| 7,545,640 B2 | 6/2009 | Fisher |
| 2005/0214180 A1 | 9/2005 | Joannou |
| 2009/0261268 A1* | 10/2009 | Schwiebert ............... B03C 3/49 |
| | | 250/424 |
| 2011/0036552 A1 | 2/2011 | Lu |
| 2011/0261499 A1 | 10/2011 | Hizer |

(Continued)

FOREIGN PATENT DOCUMENTS

| | | |
|---|---|---|
| WO | 2007/112763 A1 | 10/2007 |
| WO | 2009/131980 A2 | 10/2009 |
| WO | 2012/006361 A2 | 1/2012 |

*Primary Examiner* — Rami R Okasha
(74) *Attorney, Agent, or Firm* — Prol Intellectual Property Law, PLLC; H. Kenneth Prol

(57) ABSTRACT

An information handling system includes a processor, a memory device, and a PMU to provide power to the processor and memory device. The information handling system may also include an enclosed ion emitter cooling system including an ion emitter hub and an ion collector ring surrounding the ion emitter hub, the processor executing code instructions of an ion emitter control system to activate an ionic driving circuit, and an ionic driving circuit operatively coupled to the ion emitter hub and applying a first voltage to produce and repel ionized gases at the ion emitter hub and the ion collector ring and applying a second voltage to attract and deionize those ionized gases wherein movement of the ionized gases from the ion emitter hub to the ion collector ring causes an airflow within the enclosed ion emitter cooling system.

20 Claims, 5 Drawing Sheets

(56) References Cited

U.S. PATENT DOCUMENTS

| | | | |
|---|---|---|---|
| 2011/0292593 A1* | 12/2011 | June | G06F 1/206 |
| | | | 361/679.48 |
| 2012/0007742 A1 | 1/2012 | Gooch | |
| 2012/0008248 A1 | 1/2012 | Sawyer | |
| 2012/0036998 A1* | 2/2012 | June | F04D 27/00 |
| | | | 95/57 |
| 2012/0049083 A1* | 3/2012 | Hung | H01T 19/04 |
| | | | 250/423 R |
| 2012/0057356 A1 | 3/2012 | Hizer | |
| 2012/0168906 A1* | 7/2012 | Kuo | H10D 89/711 |
| | | | 257/E29.171 |
| 2013/0021715 A1 | 1/2013 | Jewell-Larsen | |
| 2015/0174587 A1* | 6/2015 | Wei | B03C 3/08 |
| | | | 96/92 |
| 2016/0265856 A1* | 9/2016 | Saveliev | F28F 13/16 |
| 2021/0164704 A1* | 6/2021 | Puago Martinez | F25B 21/00 |
| 2022/0210945 A1* | 6/2022 | Vadillo | H01T 19/04 |

\* cited by examiner

METHOD AND APPARATUS FOR AN ENCLOSED IONIC THERMAL MODULE

FIELD OF THE DISCLOSURE

The present disclosure generally relates to ion emitters. The present disclosure more specifically relates to ion emitters used to cool an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include a cooling system used to cool hardware therein such as a processing device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
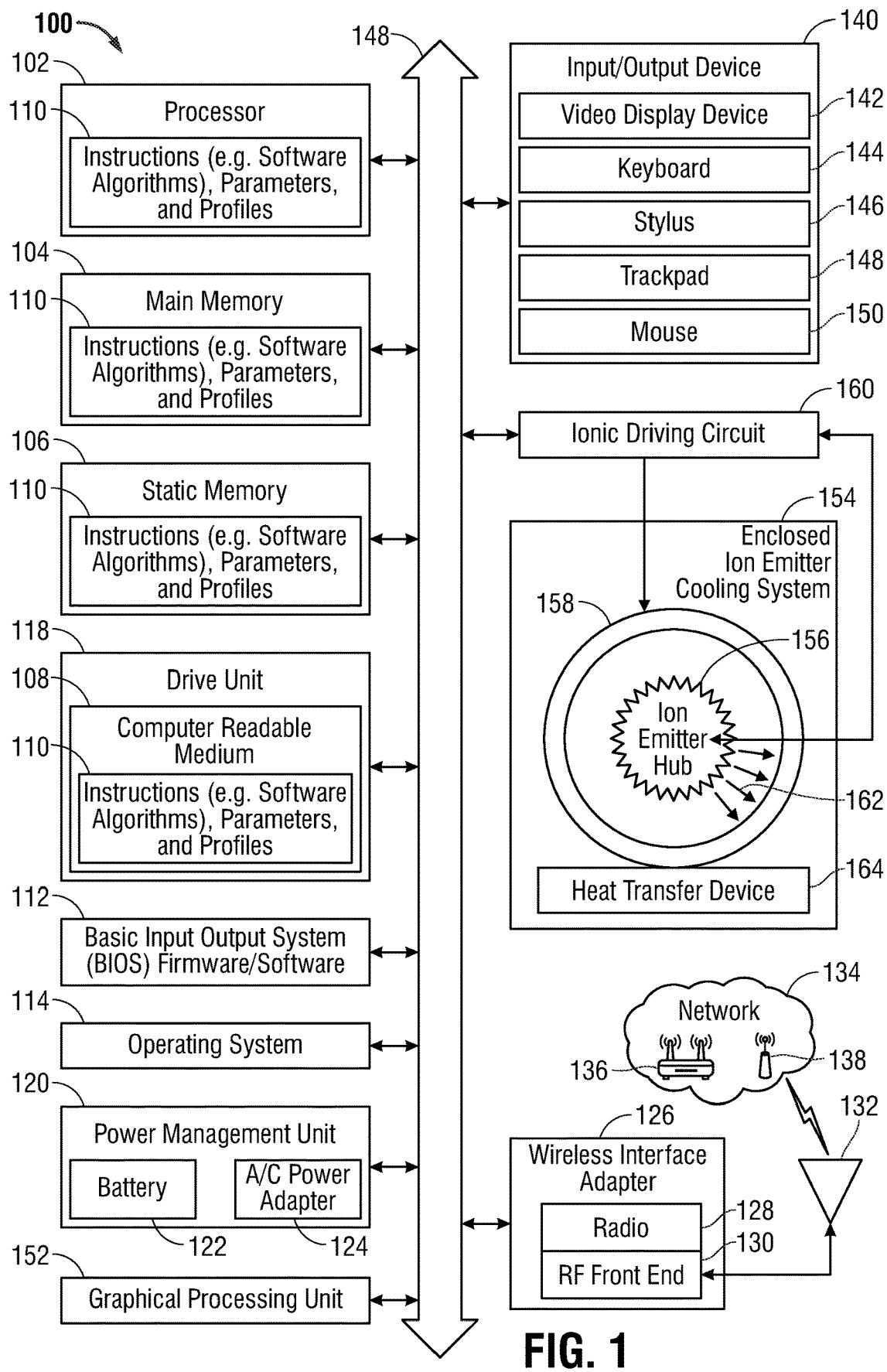
FIG. 1 is a block diagram of an information handling system including an enclosed ion emitter cooling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems operate to provide computing, data storage, and application resources among other computing resources. The hardware used to provide these resources to the user consume electricity. As a result of the consumption of this electricity, heat is produced within the housing or other structures used to house the hardware. Some information handling systems include a fan used to blow heat from within the housing to a vent to vent the heated air from within the housing. However, these fans may create a higher degree of noise that may interfere with the use of the information handling system especially when the fan speed is increased due to increased power consumption and a resulting increase in temperature within the housing.

The present specification describes information handling system that includes a processor, a memory device, a power management unit (PMU) to provide power to the processor and memory device. The information handling system further includes an enclosed ion emitter cooling system used to draw heated air from within a housing of the information handling system and out of a vent. The enclosed ion emitter cooling system includes an ion emitter hub and an ion collector ring encircling the ion emitter hub an ionic driving circuit operatively coupled to the ion emitter hub to produce and repel ionized gases at the edges of the ion emitter hub and the ion collector ring to attract and deionize those ionized gases. In an embodiment, movement of the ionized gases from the ion emitter hub to the ion collector ring causes airflow within the enclosed ion emitter cooling system.

In an alternative embodiment, the information handling system may include an enclosed ion emitter cooling system that includes an ion collector hub and an ion emitter ring encircling the ion collector hub. In an embodiment, an ionic driving circuit operatively coupled to the ion emitter ring to produce and repel ionized gases at the internal edges of the ion emitter ring and the ion collector hub to attract and deionize those ionized gases. This allows for movement of the ionized gases from the ion emitter ring to the ion collector hub causes airflow out of the enclosed ion emitter cooling system. In an embodiment, the ion collector/emitter ring may include thermal fins formed therein to receive heat from a heat conductive device and exhaust that heat via the airflow passing through the thermal fins.

The enclosed shape of the ion collector/emitter ring and ion emitter/collector hub described herein allows for relatively more heat conductance from within the housing of the information handling system and provides for a small footprint for a cooling system. With thermal fins formed into the ion collector/emitter ring there is a relatively larger surface area for heat to be dissipated from within the housing of the information handling system without increasing the size of the enclosed ion emitter cooling system. It is appreciated that the enclosed ion emitter cooling system may provide for airflow in either direction such that hot air may be exhausted through a top (or bottom depending on orientation) aperture of the enclosed ion emitter cooling system when a center hub is used as a collector in some embodiments. This allows an information handling system such as a laptop or tablet information handling system to have an exhaust vent on a bottom surface or top surface of a chassis in some embodiments.

In an embodiment, the distance of an outer diameter of the ion collector hub/ion emitter hub to the ion emitter ring/ion collector hub may be sufficient to create an electric field between them. This is done so that ions created by the ion emitter hub or ion emitter ring may be sufficiently attracted from the ion emitter hub to the ion collector ring, or vice versa, along those electric fields for the ions to follow.

The ionic driving circuit may be operatively coupled to the ion emitter/collector hub such that the ion emitter/collector hub may have a first voltage from the high voltage source of the ionic driving circuit. The ion collector/emitter ring may have a second voltage from the high voltage source of the ionic driving circuit. This second voltage may be ground or, in an embodiment, an opposite voltage of the first voltage. In an embodiment, the ion emitter/collector hub may be operatively coupled to either ground or the second voltage source while the ion collector/emitter ring may be operatively coupled to the first voltage source. In such an embodiment, the ion emitter/collector hub may operate as the ion collector while the ion collector/emitter ring thereby providing a reverse airflow relative to the opposite voltage couplings. It is appreciated that the enclosed ion emitter cooling system may provide for airflow in either direction such that hot air may be exhausted through a top (or bottom depending on orientation) aperture of the enclosed ion emitter cooling system when a center hub is used as a collector in some embodiments. This allows an information handling system such as a laptop or tablet information handling system to have an exhaust vent on a bottom surface or top surface of a chassis in some embodiments.

In an embodiment, the ion collector/emitter ring may be in the shape of a circular ring with the ion emitter/collector hub is in the shape of a cylinder placed within the ion collector/emitter ring. In another embodiment, the ion collector/emitter ring may be in the shape of a hexagonal ring with the ion emitter/collector hub being in the shape of a hexagonal cylinder. It is appreciated that the shape either the ion collector/emitter ring or ion emitter/collector hub may be any shape with the ion emitter/collector hub being surrounded by the ion collector/emitter ring in some embodiments including any circular, oval, polygonal, or irregular shape of an emitter/collector hub surrounded by a collector/emitter ring structure in various embodiments herein.

In an embodiment, an ionic driving circuit may provide the first voltage source and second voltage source. The ionic driving circuit may include various circuitry such as a step-up converter used to increase the voltage applied to either the ion emitter/collector hub or ion collector/emitter ring, or both.

FIG. 1 illustrates an information handling system 100 similar to information handling systems according to several aspects of the present disclosure that is operatively couplable to an enclosed ion emitter cooling system include an enclosed ion emitter cooling system 154 formed within a housing of the information handling system of embodiments herein. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with any wireless peripheral devices. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more processing resources, such as a central processing unit (CPU), a graphics processing unit (GPU) 152, processing, hardware, controller, or any combination thereof. Additional components of the information handling system 100 can include one or more storage devices, one or more communications ports for communicating with external devices, as well as various input and output (110) devices 140, such as a keyboard 144, a mouse 150, a video display device 142, a stylus 146, a trackpad 148, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described herein. The information handling system 100 may execute code instructions 110 via hardware processing resources that may operate on servers or systems, remote data centers, or on-box in individual client information handling systems according to various embodiments herein. In some embodiments, it is understood any or all portions of code instructions 110 may operate on a plurality of information handling systems 100. Code instructions 110 may include an enclosed ion emitter control system executed by a hardware processor, hardware controller, or a PMU hardware controller or some combination in various embodiments.

The information handling system 100 may include processing resources such as a processor 102, a central processing unit (CPU), accelerated processing unit (APU), a neural processing unit (NPU), a vision processing unit (VPU), an embedded controller (EC), a digital signal processor (DSP), a GPU 152, a microcontroller, or any other type of processing device that executes code instructions to perform the processes described herein. Any of the hardware processing resources may operate to execute code instructions 110 that are either firmware or software code. Moreover, the information handling system 100 can include memory such as main memory 104, static memory 106, computer readable medium 108 storing instructions 110 of, in an example embodiment, or other computer executable program code, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, or a gesture or touch screen input device associated with the video display device 142 that allow a user to interact with the images, windows, and applications presented to the user. In an embodiment, the video display device 142 may provide output to a user that includes, for example, one or more windows describing one or more instances of code instructions 110 for applications being executed by the processor 102 of the information handling system. In this example embodiment, a window may be presented to the user that provides a graphical user interface (GUI) representing the execution of that application.

The network interface device of the information handling system 100 shown as wireless interface adapter 126 can provide connectivity among devices such as with Bluetooth® or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 to a network 134. In a specific embodiment, the network 134 may include macro-cellular connections via one or more base stations 138 or a wireless access point 136 (e.g., Wi-Fi), or such as through licensed or unlicensed WWAN small cell base stations 138. Connectivity may be via wired or wireless connection. For example, wireless network access points 136 or base stations 138 may be operatively connected to the information handling system 100. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 may provide connectivity to one or more of the peripheral devices that may include a wireless video display device 142, a wireless keyboard 144, a wireless mouse 150, a wireless headset, a microphone, a wireless stylus 146, and a wireless trackpad 148, among other wireless peripheral devices used as input/output (I/O) devices 140. The wireless interface adapter 126 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth® wireless link using a Bluetooth® wireless or Bluetooth® Low Energy (BLE). In an embodiment, the Bluetooth® wireless protocol may operate at frequencies between 2.402 to 2.48 GHz. Other Bluetooth® operating frequencies such as Bluetooth® operating frequencies such as 6 GHz are also contemplated in the presented description. In an embodiment, a Bluetooth® wireless link may be used to wirelessly couple the input/output devices operatively and wirelessly including the mouse 150, keyboard 144, stylus 146, trackpad 148, and/or video display device 142 to the bus 116 in order for these devices to operate wirelessly with the information handling system 100. In a further aspect, the wireless interface adapter 126 may operate the two or more wireless links with a single, shared communication frequency band such as with the 5G or Wi-Fi WLAN standards relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 132 may be capable of operating at a variety of frequency bands. In an embodiment described herein, the shared, wireless communication band may be transmitted through a plurality of antennas used to operate in an N×N MIMO array configuration where multiple antennas 132 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the −5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, the information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 130 circuits) of the information handling system 100 may operate on a licensed WWAN wireless radio with authorization for subscriber access to a wireless service provider on a carrier licensed frequency band.

The wireless interface adapter 126 can represent an add-in card, wireless network interface module that is integrated with a main board of the information handling system 100 or integrated with another wireless network interface capability, or any combination thereof. In an embodiment the wireless interface adapter 126 may include one or more radio frequency subsystems including transmitters and wireless controllers for connecting via a multitude of wireless links. In an example embodiment, an information handling system 100 may have an antenna system transmitter for Bluetooth®, BLE, 5G small cell WWAN, or Wi-Fi WLAN connectivity and one or more additional antenna system transmitters for macro-cellular communication. The RF subsystems and radios 128 and include wireless controllers to manage authentication, connectivity, communications, power levels for transmission, buffering, error correction, baseband processing, and other functions of the wireless interface adapter 126.

As described herein, the information handling system 100 may include and be operatively coupled to an enclosed ion emitter cooling system 154. The enclosed ion emitter cooling system 154 may be coupled within a housing of the information handling system 100 in an embodiment so that heat generated by the operation of the hardware (e.g., processor 102, memory devices 104, 106, PMU 120, etc.) may be directed out of the housing of the information handling system 100 via a heat vent formed in the housing.

The enclosed ion emitter cooling system 154 may include an ion emitter/collector hub 156 and an ion collector/emitter ring 158. As described herein, the ion emitter/collector hub 156 may be placed within the ion collector/emitter ring 158. In an embodiment, the distance between an outer surface of the ion emitter/collector hub 156 and an inner surface of the ion collector/emitter ring 158 may be between 5 mm and 10 mm to provide for an electrical field to be created between the ion emitter/collector hub 156 and ion collector/emitter ring 158 during operation of the enclosed ion emitter cooling system 154.

In an embodiment the ion emitter/collector hub 156 may operate as an ion emitter or ion generator. In an embodiment, the ion emitter/collector hub 156 may operate as an ion collector or ion deionizer. In an embodiment, the ion emitter/collector hub 156 may operate as an ion emitter or ion generator under a first set of conditions and operate as an ion collector or ion deionizer under a second set of conditions. In an embodiment, the first set of conditions may include a positive electrode of a high voltage source of the ionic driving circuit 160 being operatively coupled to the ion emitter/collector hub 156. In an embodiment, the second set of conditions may include a negative electrode of the high voltage source of the ionic driving circuit 160 being operatively coupled to the ion emitter/collector hub 156. In an embodiment, an electrical lead operatively coupled to the ion emitter/collector hub 156 may selectively operate as either the positive electrode or a negative electrode depending on the arrangement of the power source. Control of voltage to the ion emitter/collector hub 156 may be via code instructions of an ion emitter control system in an embodiment.

In an embodiment the ion collector/emitter ring 158 may operate as an ion emitter or ion generator. In an embodiment, the ion collector/emitter ring 158 may operate as an ion collector or ion deionizer. In an embodiment, the ion collector/emitter ring 158 may operate as an ion emitter or ion generator under a first set of conditions and operate as an ion collector or ion deionizer under a second set of conditions. In an embodiment, the first set of conditions may include a positive electrode of the high voltage source of the ionic driving circuit 160 being operatively coupled to the ion collector/emitter ring 158. In an embodiment, the second set of conditions may include a negative electrode being operatively coupled to the ion collector/emitter ring 158. In an embodiment, an electrical lead operatively coupled to the ion collector/emitter ring 158 may selectively operate as either a positive electrode or a negative electrode depending on the arrangement of the power source. Control of voltage to the ion collector/emitter ring 158 may be via code instructions of an ion emitter control system in an embodiment.

In the context of the present specification, the term "emit" or "emitter" is meant to describe an action and device that, at its edges, creates/generates ions and, via an electromagnetic repulsion, repels those ions towards an oppositely charged source such as the ion emitter/collector hub 156 or ion collector/emitter ring 158 described herein to generate a first airflow 162. In an embodiment, the high voltage source of the ionic driving circuit 160 causes electrons to be stripped from atoms in the atmospheric air either at the ion emitter/collector hub 156 or ion collector/emitter ring 158 as described herein. In an embodiment, gas atoms between the ion emitter/collector hub 156 and ion collector/emitter ring 158 are ionized via this stripping of the electrons from these atoms. This ionization process may include the stripping of one or more electrons to the outer valence shells of the individual atoms within the gas such that they become positively charged (e.g., cation). In an example where the space between the ion emitter/collector hub 156 and ion collector/emitter ring 158 includes atmospheric air, any number of types of gas atoms may be subjected to this process. For example, where the gas includes oxygen (O), the ionization of oxygen may include the removal of a single electron or two electrons from the outermost valence electron shell. This may lead to a $O^+$ or $O^{2+}$ ion (e.g., anion) being created by the ion emitter/collector hub 156 or ion collector/emitter ring 158 (depending on their operating states) and the ionic driving circuit 160 in an embodiment. Other gas atoms such as nitrogen (N) (e.g., $N^{+1}$, $N^{+2}$ ions) within the atmosphere between the ion emitter/collector hub 156 and ion collector/emitter ring 158 may similarly be ionized.

This ionization of the atmospheric gases between the ion emitter/collector hub 156 and ion collector/emitter ring 158 helps to cause the first airflow 162 to be created in a first direction as shown, a second direction by reversing electrodes of the emitter and collector, or dynamically from a first direction to a second direction and vice versa via an ion emitter control system. Because the ion emitter/collector hub 156 may operate as either an ion emitter/generator or as an ion collector/deionizer, the direction of airflow 162 between the ion emitter/collector hub 156 and ion collector/emitter ring 158 may dynamically change during operation of the enclosed ion emitter cooling system 154. In an embodiment, the ion emitter/collector hub 156 may operate as an ion emitter/generator by being operatively coupled to a high voltage source of the ionic driving circuit 160 (e.g., a positive electrode) to create positively-charged ions via electron stripping of these electrons from the valence electron shells of the atoms of gases present. Because the ions are now positively charged, they are repelled away from the ion emitter/collector hub 156 and towards the ion collector/emitter ring 158 operating, in this example embodiment, as an ion collector/deionizer. The movement of these positively-charged ions within the air in the enclosed ion emitter cooling system 154 causes a shearing force to be applied to other gas atoms and molecules in atmosphere (either ionized or not) thereby creating the airflow 162 from the ion emitter/collector hub 156 to towards the ion collector/emitter ring 158 (e.g., a first direction of airflow 162). When the positively-charged ions reach the ion collector/emitter ring 158, the positively-charged ions are deionized because the ion collector/emitter ring 158 is operating as an ion deionizer/collector by being operatively coupled to ground or a negative electrode of the high voltage source of the ionic driving circuit 160.

Again, in another embodiment, the ion emitter/collector hub 156 may operate as an ion collector/deionizer by being operatively coupled to a negative electrode of a high voltage source of the ionic driving circuit 160 to deionize positively-charged ions created by the ion collector/emitter ring 158 operating as the ion emitter/generator. In an alternative embodiment, the ion emitter/collector hub 156 operating as an ion collector/deionizer may be operative coupled to ground. Because the ions generated by the ion collector/emitter ring 158 are positively-charged, they are repelled away from the ion collector/emitter ring 158 and towards the ion emitter/collector hub 156. The movement of these positively-charged ions within the air in the enclosed ion emitter cooling system 154 causes a shearing force to be applied to other gas atoms and molecules in atmosphere thereby creating the airflow from the ion collector/emitter ring 158 towards the ion emitter/collector hub 156 (e.g., a second direction of airflow opposite to the airflow 162 shown in FIG. 1). When the positively-charged ions reach the ion emitter/collector hub 156, the positively-charged ions are deionized because the ion emitter/collector hub 156 is operating as an ion deionizer/collector by being operatively coupled to ground or a negative electrode of the high voltage source of the ionic driving circuit 160 as described herein.

In an embodiment, the ion emitter/collector hub 156 and ion collector/emitter ring 158 may each be operatively coupled to an electrode (e.g., negative electrode or positive electrode) of the high voltage source (or ground in some example embodiments) of the ionic driving circuit 160 so that the voltages may be selectively alternated. Control of the ion collector/emitter ring 158 may be managed by code instructions 110 of an ion emitter control system executing on a hardware processing resource to instruct the ionic driving circuit 160 to provide a first and second voltage to the ion emitter/collector hub 156 and ion collector/emitter ring 158, respectively. For example, where the ion emitter/collector hub 156 is operatively coupled to a positive electrode of the high voltage source of the ionic driving circuit 160, the ionic driving circuit 160 may dynamically switch the voltage applied to the ion emitter/collector hub 156 so that the ion emitter/collector hub 156 is now operatively coupled to a negative electrode of the high voltage source of the ionic driving circuit 160. As a result, the direction of the airflow may switch from the first direction of airflow 162 to a second, reverse direction of airflow (not shown) dynamically. In the context of the enclosed ion emitter cooling system 154, this allows air to be passed out of the housing of the information handling system 100 or into the housing of the information handling system 100 dynamically in an embodiment from a partitioned exhaust vent. While passing air out of the housing of the information handling system 100, the airflow in the first direction causes heated air to pass out of the housing thereby cooling the hardware present in the housing of the information handling system. In an embodiment, passing air into the housing of the information handling system (e.g., second direction of airflow) may also serve another purpose such as dislodging dust particles accumulated on or near the enclosed ion emitter cooling system 154 or to exhaust heated air at a different air vent in the information handling system 100. This allows the ion emitter/collector hub 156 and ion collector/emitter ring 158 to, dynamically, be cleaned occasionally via operation of the enclosed ion emitter cooling system 154 while also cooling the hardware within the housing of the information handling system 100.

In an embodiment, the enclosed ion emitter cooling system 154 includes a heat transfer device 164. The heat transfer device 164 may include any device that transfers heat from hardware operating within the housing of the information handling system 100. This hardware may include a processor 102 or other hardware processing device, wireless interface device 128, GPU 152, or other component that creates heat during operation. It is appreciated that any hardware within the housing of the information handling system may create heat during operation and the heat transfer device 164 may be used to direct heat away from this hardware and to the enclosed ion emitter cooling system 154 described herein including the ion emitter/collector hub 156 and ion collector/emitter ring 158. In an embodiment, the heat transfer device 164 may be a heat pipe. In an embodiment, the heat transfer device 164 may be a vapor chamber. It is appreciated that other types of heat transfer devices 164 may be operatively coupled to the enclosed ion emitter cooling system 154 described herein to transfer heat away from the hardware and to the enclosed ion emitter cooling system 154 and the present specification contemplates the use of these other types of heat transfer devices 164. In an embodiment, the heat transfer device 164 and the ion emitter/collector hub 156 and ion collector/emitter ring 158 of the enclosed ion emitter cooling system 154 may for a monolithic piece. In an example embodiment, a vapor chamber may be operatively coupled to the ion collector/emitter ring 158 as a monolithic piece with the ion emitter/collector hub 156 placed within the ion collector/emitter ring 158.

In an embodiment, the ion emitter/collector hub 156 may include one or more edges used, in some example embodiments, to strip electrons from atoms in the air to form the ions described herein. These edges may be, in an embodiment, protrusions extending from the ion emitter/collector hub 156 that come to a point where these electrons may be stripped away from the atoms. In an embodiment, these protrusions may be in the form of sharp edges that come to a point to facilitate emitting ions. It is appreciated that other surfaces such as edges, points and flat surfaces may be used to strip away electrons to ionize gas atoms when the ion emitter/collector hub 156 operates as an emitter.

In an embodiment, the ion collector/emitter ring 158 may include one or more thermal fins across which an airflow may pass. These thermal fins may be used, in an embodiment, to concurrently deionize the ions generated by the operation of the ion emitter/collector hub 156 and dissipate heat from the heated air in the airflow created by operation of the enclosed ion emitter cooling system 154. In an embodiment, the thermal fins formed in the ion collector/emitter ring 158 may also include edges, points or other surfaces used to strip electrons to ionize gases in the air in those circumstances where the ion collector/emitter ring 158 is used as an ion emitter or generator to create ions and create an airflow from the ion collector/emitter ring 158 to the ion emitter/collector hub 156 (e.g., the second airflow described herein). The edges of the thermal fins, in an example embodiment, may include a sharp edge to facilitate creating the ions.

The information handling system 100 can include one or more set of instructions 110 that can be executed to cause the computer system to perform any one or more of the methods or computer-based functions disclosed herein. For example, instructions 110 may execute various software applications, software agents, a basic input/output system (BIOS) 112 firmware and/or software, or other aspects or components. Code instructions 110 may include an ion collector control system as software in one embodiment executed on hardware processing resources such as a hardware processor 103 or a hardware controller. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs. Code instructions 110, such as the ion emitter control system of embodiments herein, may include firmware in whole or in part executed by hardware processing resources such as a hardware processor 102 or a hardware controller.

The disk drive unit 118 and may include a computer-readable medium 108 in which one or more sets of instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of instructions, parameters, or profiles 110 described herein. The disk drive unit 118 or static memory 106 also contain space for data storage. Further, the instructions 110 may embody one or more of the methods as described herein. In a particular embodiment, the instructions, parameters, and profiles 110 may reside completely, or at least partially, within the main memory 104, the static memory 106, and/or within the disk drive 118 during execution by the processor 102 or GPU 152 of information handling system 100. The main memory 104, GPU 152, and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may manage the power provided to the components of the information handling system 100 such as the processor 102, the enclosed ion emitter cooling system 154 that includes the fan motor 158, ionic driving circuit 160, and motor driver hardware 170, one or more drive units 118, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels and be electrically coupled, either wired or wirelessly, to the information handling system 100 to provide this power and coupled to bus 116 to provide or receive data or instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed. PMU 120 may include a hardware controller to execute code instructions 110 as software or firmware of the ion emitter control system in some embodiments to control the enclosed ion emitter cooling system 154 active cooling among other active cooling systems (e.g., one or more cooling fans). The PMU 120 may monitor temperatures via one or more temperature sensors such as thermistors in the information handling system.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a hardware device, such as an Intel® Core class processor, ARM® brand processors, Qualcomm® Snapdragon processors, or other hardware processors and chipsets, or other such hardware devices with firmware or software capable of operating a relevant environment of the information handling system. The system, or module can also include a combination of the foregoing examples of hardware, firmware, or software in some embodiments. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, or programs that are in communication with one another can communicate directly or indirectly through one or more intermediaries.

Figure 2:
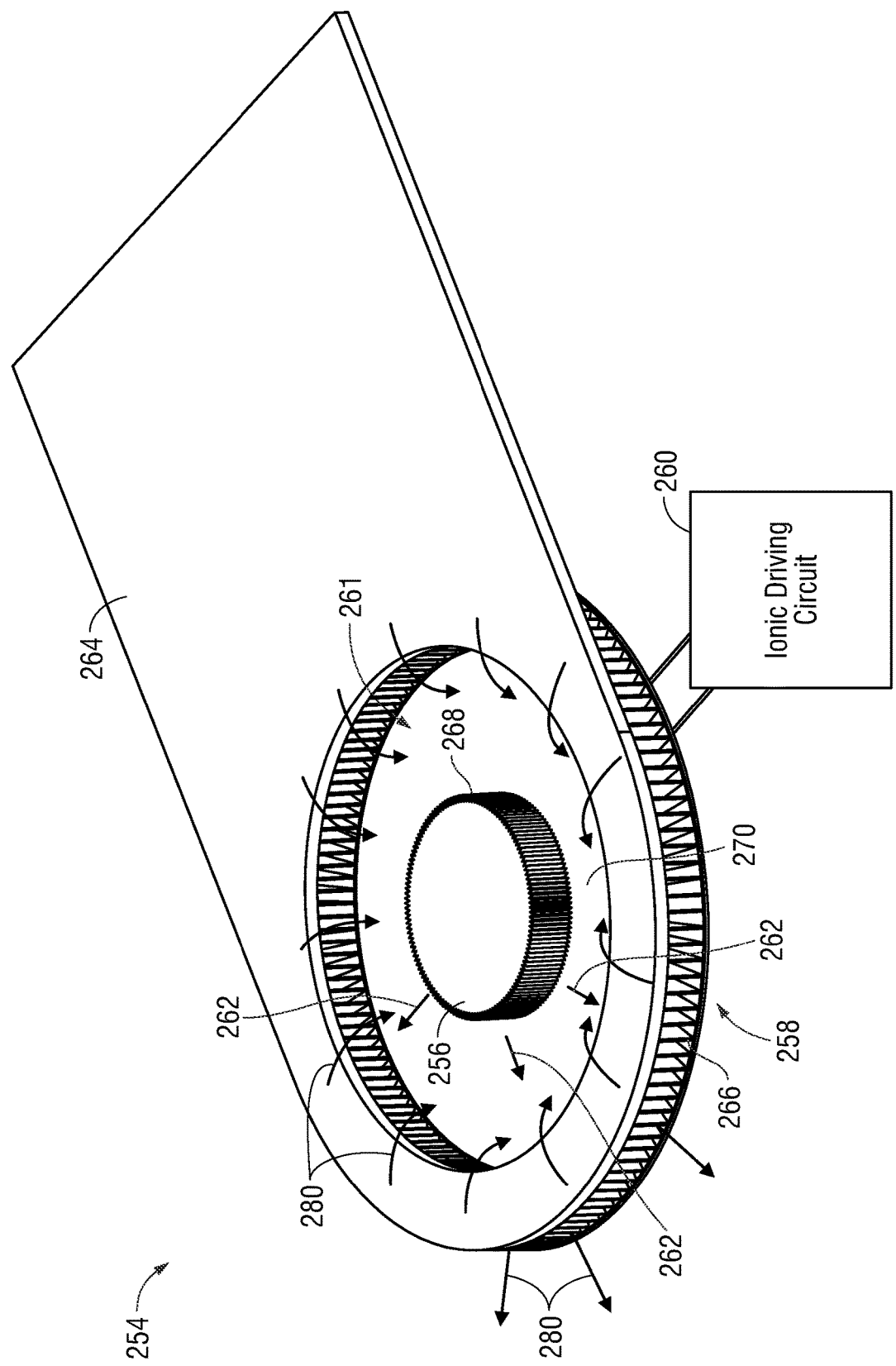
FIG. 2 is a graphic, perspective view diagram of an enclosed ion emitter cooling system of an information handling system according to an embodiment of the present disclosure.

FIG. 2 is a graphic, perspective diagram of enclosed ion emitter cooling system 254 of an information handling system according to an embodiment of the present disclosure. The example embodiment shown in FIG. 2 includes an ion emitter hub 256 placed within an ion collector ring 258. In this embodiment, as described herein, the ion emitter hub 256 operates as the portion of the enclosed ion emitter cooling system 254 that strips electrons to form ions in the air between the ion emitter hub 256 and ion collector ring 258. As described herein, the ion emitter hub 256 may be operatively coupled to a first electrode (e.g., a positive electrode) of a high voltage source of the ionic driving circuit 260 and the ion collector ring 258 may be operatively coupled to a second electrode (e.g., negative electrode) of the high voltage source of the ionic driving circuit 260. In another embodiment, the ion collector ring 258 may be operatively coupled to a grounding source of the high voltage source of the ionic driving circuit 260. In these embodiments, when the high voltage source is operated, an electric field is created between the ion emitter hub 256 and the ion collector ring 258 allowing for a repulsive and attractive force to be applied to the ions created to shear or drag surrounding air and generate ionic airflow 262 as described herein.

The ion emitter hub 256, in an embodiment, includes one or more hub protrusions 268 that extend out from a central portion of the ion emitter hub 256. In an embodiment, these hub protrusions 268 may include an edge that facilitates ion formation within the atmospheric air when a high voltage source, operatively coupled to the ion emitter hub 256, provides a high voltage (e.g., 2V to 10V). In an embodiment, the hub protrusions 268 may include a sharp edge with the sharp edge running along a height of the ion emitter hub 256. This allows for multiple points around the ion emitter hub 256 to be used to create ions within the enclosed ion emitter cooling system 254. In an embodiment, the movement of the ions generate airflow 262 radially, or 360 degrees, out from the ion emitter hub 256. As described herein, the ions generated by the ion emitter hub 256 are repelled from the ion emitter hub 256 and drawn toward the ion collector ring 258 as a result of the electromagnetic repulsion of the ion emitter hub 256 on the positively-charged ions and the electromagnetic attraction of the ion collector ring 258 to those positively-charged ions. In this embodiment, a positive electrode of the high voltage source of the ionic driving circuit 260 is operatively coupled to the ion emitter hub 256 while a negative electrode is operatively coupled to the ion collector ring 258. The movement of these positively-charged ions within the air in the enclosed ion emitter cooling system 254 causes a shearing force to be applied to other gas atoms and molecules in atmosphere (either ionized or not) thereby creating the airflow 262 from the ion emitter hub 256 and towards the ion collector ring 258 (e.g., described herein as a first direction of airflow 262). This airflow 262 also draws airflow 280 into an inlet aperture 261 which may be passed to an inlet vent on an information handling system chassis. Airflow 280 is represented in FIG. 2 by downturn arrows that show an airflow 280 entering into an opening formed by the top inlet aperture 261 in the enclosed ion emitter cooling system 254. When the positively-charged ions generate airflow 262 to reach the ion collector ring 258, the positively-charged ions are deionized because the ion collector ring 258 is operating as an ion deionizer/collector by being operatively coupled to ground or the negative electrode of the high voltage source of the ionic driving circuit 260. The airflow 262 pulls in the airflow 280 and may continue through thermal fins 266 of the ion collector ring 258 and out from the enclosed ion emitter cooling system 254 as indicated by straight arrows radiating from the outer side of the ion collector ring 258. In one embodiment, the airflow 262 may then be disseminated within the information handling chassis and exit a second vent in the information handling system chassis.

Control of the ion emitter hub 256 and ion collector ring 258 may be managed by code instructions (e.g., 110 in FIG. 1) of an ion emitter control system executing on a hardware processing resource to instruct the ionic driving circuit 260 to provide a first and second voltage to the ion emitter hub 256 and ion collector ring 258, respectively, or vice versa. The ion emitter control system executing on a hardware processing resource may selectively turn on or turn off the operation of the enclosed ion emitter cooling system 254 and may turn on the enclosed ion emitter cooling system 254 when a temperature threshold associated with hardware within the information handling system is reached or when other factors indicate that the enclosed ion emitter cooling system 254 is to be turned on. Further, additional levels of voltage supplied to the collector or emitter may be controlled to control airflow volume in some embodiments.

In an embodiment, the ion collector ring 258 includes one or more thermal fins 266. During operation, the thermal fins 266 may be used to dissipate heat from the heated components into the airflow 262 (e.g., the first direction of airflow as described herein) as it passes through the ion collector ring 258. The thermal fins 266, in an embodiment, may be located near a venting port formed into a housing of the information handling system, in one embodiment, so that the airflow 280 may exit the housing of the information handling system resulting in the cooling of the hardware within the housing of the information handling system.

In an embodiment, the enclosed ion emitter cooling system 254 includes an electrically insulative substrate 270 that is operatively coupled to the ion emitter hub 256 and ion collector ring 258. The electrically insulative substrate 270 operatively orients the ion emitter hub 256 relative the ion collector ring 258 but electrically insulates the ion emitter hub 256 and ion collector ring 258 from one another. The electrically insulative substrate 270, therefore, provides a substrate onto which, at least, the ion emitter hub 256 may be oriented near the ion collector ring 258 (e.g., 5 mm to 10 mm apart) but allows for the electrical field to be created between the ion emitter hub 256 and the ion collector ring 258. In an embodiment, the positive electrode associated with the high voltage source of the ionic driving circuit 260 may be operatively coupled to the ion emitter hub 256 via a hole formed into the electrically insulative substrate 270. In an embodiment, the negative electrode associated with the high voltage source of the ionic driving circuit 260 may be operatively coupled to the ion collector ring 258 via another hole formed in the electrically insulative substrate 270.

As described herein, the enclosed ion emitter cooling system 254 may include a heat transfer device 264 such as a passive cooling system such as a vapor chamber, heat pipe, cold plate or other heat transfer device 264 operatively coupled to, at least, the ion collector ring 258 and, in another embodiment, to the ion emitter hub 256. In the example embodiment shown in FIG. 2, the heat transfer device 264 is a vapor chamber. A vapor chamber, in an example embodiment, may include a tubular and sealed pipe with a working fluid therein. As the vapor chamber receives heat from a source such as a radio module, a central processing unit (CPU), a graphical processing device (GPU), other processing devices, and the like, the working fluid may absorb that heat and move from one state to another (e.g., liquid state into a gas state) as the temperature changes. Heat received in the vapor chamber may be dumped at the enclosed ion emitter cooling system 254 described herein. In the example embodiment shown in FIG. 2, this vapor chamber may form a top portion of the ion collector ring 258 so that the airflow 280 passing into the top intake aperture 261 formed by the ion collector ring 258 may pass over the vapor chamber, get heated, pass through the ion collector ring 258 and out from the housing of the information handling system. In an embodiment, any surface of the heat transfer device 264 transfers heat to the airflow 262 that is removed from within the housing of the information handling system and cooled by airflow 280 including via operation of the enclosed ion emitter cooling system 254 described in connection with FIG. 2.

The enclosed shape of the ion collector ring 258 and ion emitter hub 256 described herein allows for relatively more heat conductance from within the housing of the information handling system. With thermal fins formed into the ion collector ring 258 there is a relatively larger surface area for heat to be dissipated from within the housing of the information handling system without increasing the size of the enclosed ion emitter cooling system. The enclosed ion emitter cooling system 254 described herein may be placed within a chassis of the information handling system. As described herein, the enclosed ion emitter cooling system 254 may be placed near heat generating hardware such as a processing device (e.g., CPU, processor, GPU, etc.). In an embodiment, the heat transfer device 264 of the enclosed ion emitter cooling system 254 may be thermally coupled to the heat generating hardware. In an embodiment, the heated component may be located within a base chassis that includes a c-cover or top cover and d-cover or bottom cover of a laptop-type information handling system base chassis. In some embodiments, the chassis of a laptop type information handling system may include a display housing that includes an "a-cover" which serves as a back cover for the display housing and a "b-cover" which may serve as the bezel for a display screen of the information handling system such as a laptop information handling system. In this example embodiment, this laptop-type information handling system may have a chassis that forms a base housing and includes a "c-cover" or top cover housing a keyboard, touchpad/trackpad, and any cover in which these components are set, and a "d-cover" or bottom cover housing a processing device, memory, a power management unit (PMU), wireless interface adapter and other components of the information handling system in the base housing for the laptop-type information handling system. In an embodiment, the top intake aperture 261 (as shown, but may be orientated in any direction) may be housed within the base chassis while an outer surface of the ion collector ring 258 may be placed next to an outlet vent formed in the c-cover, d-cover, or a combination thereof of the base chassis. In another embodiment, the top intake aperture 261 may be placed adjacent to an inlet vent formed in the base chassis of the information handling system (e.g., the c-cover, d-cover or a combination thereof) to draw air into the base chassis of the information handling system, pass through the intake aperture 261, between the ion emitter hub 256 and ion collector ring 258, and out of an outlet vent formed at a different location along the housing of the base chassis (e.g., c-cover, d-cover, or a combination thereof).

As described herein, the heat transfer device 264 (e.g., a vapor chamber) and the enclosed ion emitter cooling system 154 may be thermally coupled to other active or passive cooling devices. In an example embodiment, the heat transfer device 264 may be thermally coupled to a heat sink such as a heat pipe, vapor chamber, cold plate or other passive cooling structure physically and thermally coupled to a heat generating hardware device such as, for example, a CPU within the base chassis of the information handling system. The heat sink may conduct heat away from the CPU and into the heat transfer device 264 of the enclosed ion emitter cooling system 254 described herein. In an embodiment, the airflow 262 created by the ionic movement may be drawn away from the ion collector ring 258 via operation of a fan. This fan may supplement the airflow 262 created via operation of the enclosed ion emitter cooling system 254 described herein and may assist to pass the heated air out from the base chassis of the information handling system via an outlet vent formed in the base chassis (e.g., a c-cover, a d-cover, or a combination thereof).

Figure 3:
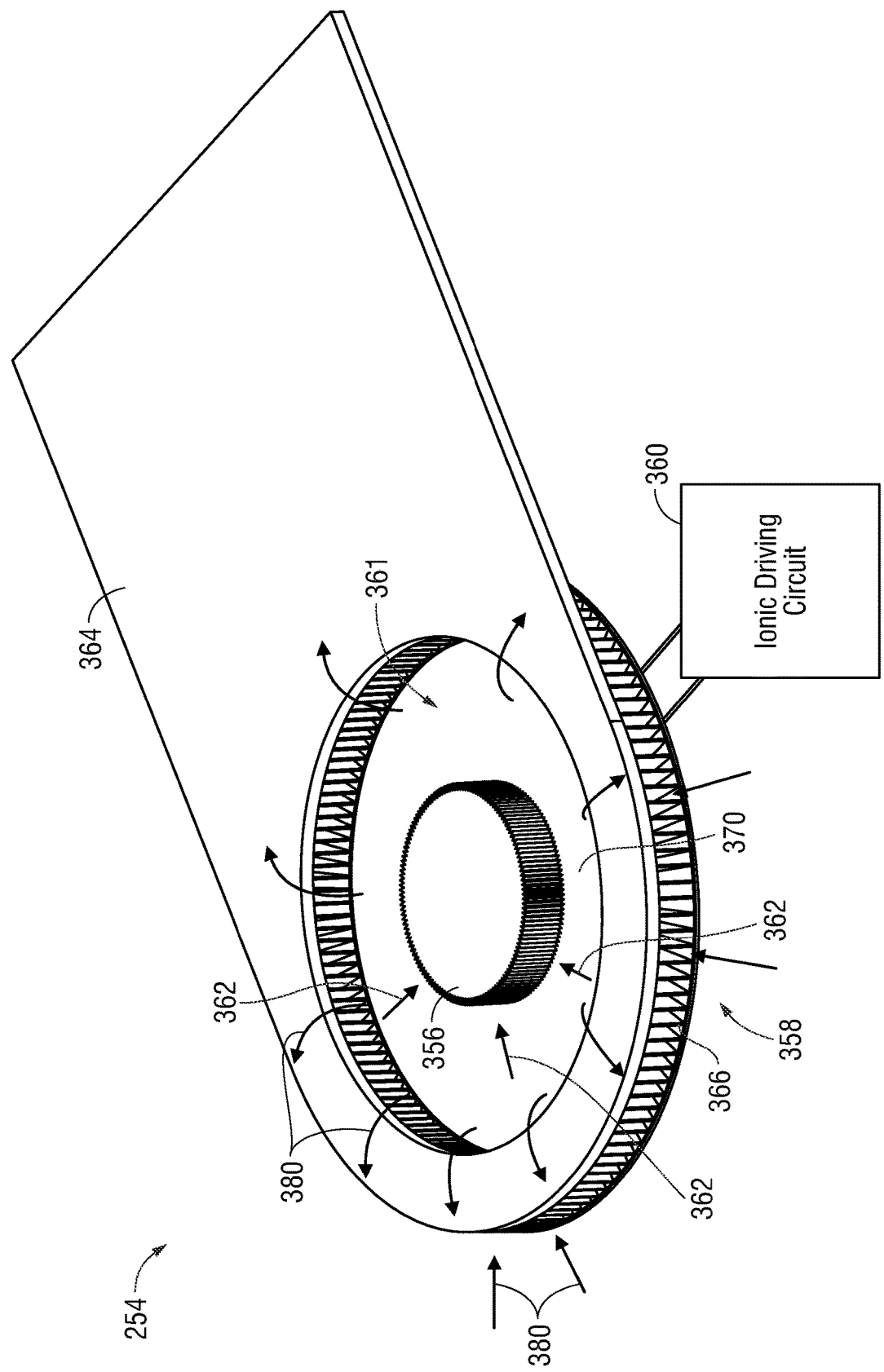
FIG. 3 is a graphic, perspective view diagram of an enclosed ion emitter cooling system of an information handling system according to another embodiment of the present disclosure.

FIG. 3 is a graphic, perspective view diagram of an enclosed ion emitter cooling system 354 of an information handling system according to another embodiment of the present disclosure. The example embodiment shown in FIG. 3 includes an ion collector hub 356 placed within an ion emitter ring 358. As described herein, the ion collector hub 356, instead of operating as in ion emitter as shown in FIG. 2, may operate as an ion collector to receive and deionize ions generated and emitted by the ion emitter ring 358 now, in this embodiment, operating as an ion emitter. As described herein, this allows the enclosed ion emitter cooling system 354 to create an airflow 362 in an opposite direction than the airflow 262 as shown in FIG. 2.

As described in an embodiment herein, the ion collector ring 358 may operate as an ion emitter while the ion emitter hub 356 operates as an ion collector/deionizer. In this embodiment, the thermal fins 366 may be used to strip electrons from atoms in the air within the enclosed ion emitter cooling system 354 to form ions within the atmosphere in the enclosed ion emitter cooling system 354. As a result of this example operation of the ion collector ring 358 and ion emitter hub 356, those ions generated at the edges of the thermal fins 366 of the ion collector ring 358 are repelled from the ion collector ring 358 and attracted to the ion emitter hub 356 as a result of the created electric field created between the ion emitter hub 356 and ion collector ring 358. The movement of these positively-charged ions within the air in the enclosed ion emitter cooling system 354 causes a shearing force to be applied to other gas atoms and molecules in atmosphere thereby creating the airflow 362 from the ion collector ring 358 towards the ion emitter hub 356 (e.g., a second direction of airflow 362 as described herein). When the positively-charged ions reach the ion emitter hub 356, the positively-charged ions are deionized because the ion emitter hub 356 is operating as an ion deionizer/collector by being operatively coupled to ground or a negative electrode of the high voltage source of the ionic driving circuit 360 as described herein. The airflow created in this example embodiment may be opposite of the airflow 262 as shown in FIG. 2 and used as an enclosed ion emitter cooling system to provide the reverse airflow 362 the inertia of which further causes airflow 380 to cool an information handling system or components therein. A reverse airflow 380 may also allow, in another embodiment, for the created airflow (e.g., a second direction of airflow) to dislodge dust or other contaminates on or about the enclosed ion emitter cooling system 354 in a cleaning process for the enclosed ion emitter cooling system described in FIG. 2 above. In order to form the ions at the thermal fins 366 so as to create this reverse airflow 362, 380, each of the thermal fins 366 may have edges that facilitate the stripping of electrons from atoms in the air. In an embodiment, the edges of the thermal fins 366 may include a sharp edge that extends along the height of the ion collector ring 358.

In this embodiment, as described herein, the ion collector hub 356 operates as the portion of the enclosed ion emitter cooling system 354 that collects and deionizes the ionized gases created within the atmosphere between the ion collector hub 356 and ion emitter ring 358 by the ion emitter ring 358. As described herein, the ion collector hub 356 may be operatively coupled to an electrode (e.g., a negative electrode) of a high voltage source of the ionic driving circuit 360 and the ion emitter ring 358 may be operatively coupled to a positive electrode of the high voltage source of the ionic driving circuit 360. This reverse connection of the high voltage source by the ion driving circuit 360 may be controlled by code instructions of an ion emitter control system executing on a hardware controller or processor to change airflow direction in some embodiments. It is appreciated as well that the ion emitter ring 358 or the ion collector hub 356 may operate to generate negatively charged ions by providing an electron source to add electrons to the individual atoms within the atmosphere between the emitter ring 358 and the ion collector hub 356. Thus, although the present specification describes the generation of positively-charged ions, the present specification contemplates the generation of negatively charged ions in order to create the airflows described herein.

The ion emitter ring 358, in an embodiment, includes one or more protrusions (not shown) that extend out from each of the thermal fins 366 of the ion emitter ring 358 toward the ion collector hub 356. In an embodiment, these protrusions may include an edge, point, or other surface of the thermal fins 366 extending in form the circumference of the top aperture 361 of the enclosed ion emitter cooling system 354. The protrusions allow for facilitated ion generation from the atoms of air in the enclosed ion emitter cooling system 354 when a high voltage source operatively coupled to the ion emitter ring 358 provides a high voltage (e.g., 2V to 10V). In an embodiment, the protrusions may include a sharp edge with the sharp edge running along a height of the thermal fins 366 of the ion emitter ring 358. This allows for multiple points at the thermal fins 366 of the ion emitter ring 358 to be used to strip electrons from the atoms to create ions within the enclosed ion emitter cooling system 354. In an embodiment, the ions may be created and directed inward to the ion collector hub 356. As described herein, the ions generated by the ion emitter ring 358 are repelled from the ion emitter ring 358 and drawn toward the ion collector hub 356 as a result of the magnetic repulsion of the ion emitter ring 358 to the positively-charged ions and the magnetic attraction of the ion collector hub 356 to the positively-charged ions. In this embodiment, the positive electrode of the high voltage source of the ionic driving circuit 360 is operatively coupled to the ion emitter ring 358 while the negative electrode is operatively coupled to the ion collector hub 356. The movement of these positively-charged ions within the air in the enclosed ion emitter cooling system 354 causes a shearing force to be applied to other gas atoms and molecules in atmosphere thereby creating the airflow 362 from the ion emitter ring 358 to towards the ion collector hub 356 (e.g., described herein as a second direction of airflow 362). This airflow 362 causes airflow 380, represented in FIG. 3 by arrows that show an airflow 380 entering the ion emitter ring 358, past the thermal fins 366, and out of a discharge hole top aperture 361 formed by an opening in the ion emitter ring 358. When the positively-charged ions 362 reach the ion collector hub 356, the positively-charged ions 362 are deionized because the ion collector hub 356 is operating as an ion deionizer/collector by being operatively coupled to ground or a negative electrode of the high voltage source of the ionic driving circuit 360. The airflow 380 may continue past the ion collector hub 356 and out from the enclosed ion emitter cooling system 354 as indicated by directional arrows radiating from the interior of the ion emitter ring 358. Again, it is appreciated as well that the ion emitter ring 358 or the ion collector hub 356 may operate to generate negatively charged ions by providing an electron source to add electrons to the individual atoms within the atmosphere between the emitter ring 358 and the ion collector hub 356. Thus, although the present specification describes the generation of positively-charged ions, the present specification contemplates the generation of negatively charged ions in order to create the airflows described herein.

The ion emitter control system executing on a hardware processing resource may selectively turn on or turn off the operation of the enclosed ion emitter cooling system 354 and may turn on the enclosed ion emitter cooling system 354 when a temperature threshold associated with hardware within the information handling system is reached. In another embodiment, ion emitter control system executing on a hardware processing resource may selectively turn on or turn off the operation of the enclosed ion emitter cooling system 354 when other factors indicate that the enclosed ion emitter cooling system 354 is to be turned on such as consumption of processing resources, charging or discharging of a battery, or operation of a hard-disk drive (HDD), among other factors that describe hardware operations that may produce heat within the housing of the information handling system.

In an embodiment, the ion emitter ring 358 includes one or more thermal fins 366. During operation, the thermal fins 366 may be used to dissipate heat into airflow 380 as the airflow 380 passes through the ion collector ring 358 and when the ion emitter ring 358 is operating as an ion collector as described in connection with FIG. 3. The thermal fins 366, in an embodiment, may be located near a venting port formed into a housing of the information handling system so that the airflow 380 may exit the housing of the information handling system resulting in the cooling of the hardware within the housing of the information handling system in an embodiment.

In an embodiment, the top outlet aperture 361 (as shown) may be housed within the base chassis near an outer surface of the information handling system chassis and above a collector hub such that the outlet aperture may be placed next to an outlet vent formed in the c-cover or top cover, d-cover or a bottom cover, or a combination thereof of the base chassis. The enclosed ion emitter cooling system 354 may be any orientation. In another embodiment, the ion emitter ring 358 may be placed such that it draws airflow from within the information handling system chassis and may even be adjacent to an inlet vent formed on a side of the base chassis of the information handling system to draw air into the base chassis of the information handling system. The airflow 380 may them pass through enclosed ion emitter cooling system 354, between the ion emitter ring 358 and the ion emitter hub 356 and, and out of the outlet aperture 361 and an outlet vent formed in the c-cover or top cover or d-cover or bottom cover of the base chassis (e.g., c-cover, d-cover, or a combination thereof). In embodiments where thermal exhaust vents are formed into the d-cover of the base chassis for airflow to pass out of the housing of the information handling system, the operation of the enclosed ion emitter cooling system 354 allows the airflow to be directed downward from the base chassis where other fan systems, for example, cannot do so due to their configurations.

In an embodiment, the enclosed ion emitter cooling system 354 includes an electrically insulative substrate 370 that is operatively coupled to the ion emitter ring 358 and ion emitter ring 358. The electrically insulative substrate 370 operatively orients the ion collector hub 356 relative the ion emitter ring 358 but electrically insulates the ion collector hub 356 and ion emitter ring 358 from one another. The electrically insulative substrate 370, therefore, provides a substrate onto which, at least, the ion collector hub 356 may be oriented near the ion emitter ring 358 (e.g., 5 mm to 10 mm apart) but allows for the electrical field to be created between the ion collector hub 356 and the ion emitter ring 358. In an embodiment, the positive electrode associated with the high voltage source of the ionic driving circuit 260 may be operatively coupled to the ion emitter ring 358 via a hole formed into the electrically insulative substrate 370. In an embodiment, the negative electrode associated with the high voltage source of the ionic driving circuit 360 may be operatively coupled to the ion collector hub 356 via another hole formed in the electrically insulative substrate 370.

As described herein, the enclosed ion emitter cooling system 354 may include a heat transfer device 364 of a passive cooling system operatively coupled to, at least, the ion emitter ring 358 and, in another embodiment, to the ion collector hub 356. In the example embodiment shown in FIG. 3, the heat transfer device 364 is a vapor chamber. A vapor chamber, in an example embodiment, may include a tubular and sealed pipe with a working fluid therein. As the vapor chamber receives heat from a source such as a radio module, a central processing unit (CPU), a graphical processing device (GPU), other processing devices, and the like, the working fluid may absorb that heat and move from one state to another (e.g., liquid state into a gas state) as the temperature changes. The present specification further contemplates that other passive cooling systems may be used instead of or in addition to the vapor chamber shown in FIG. 3. These other passive cooling systems includes thermal fins, heat sinks, cold plates, and heatpipes, among others. Heat received in the vapor chamber may be dumped at the enclosed ion emitter cooling system 354 described herein. In the example embodiment shown in FIG. 3, this vapor chamber may form a top portion of the ion emitter ring 358 so that, in an embodiment, the airflow 380 passing out from the discharge top aperture 361 formed by the ion emitter ring 358 may pass over the vapor chamber, get heated, pass through the ion collector ring 258 and out from the housing of the information handling system. This airflow created (e.g., the first direction of airflow) is created when the ion collector hub 356 is operating as an ion emitter and the ion emitter ring 358 is operating as an ion collector as shown and described in FIG. 2. In an embodiment, any surface of the heat transfer device 364 may heat the air that is removed from within the housing of the information handling system via operation of the enclosed ion emitter cooling system 354 described in connection with the figures herein.

The enclosed shape of the ion emitter ring 358 and ion collector hub 356 described in FIG. 3 allows for relatively more heat conductance from within the housing of the information handling system. With thermal fins 366 formed into the ion emitter ring 358 there is a relatively larger surface area for heat to be dissipated from within the housing of the information handling system without increasing the size of the enclosed ion emitter cooling system 354. The enclosed ion emitter cooling system 354 described herein may be placed within a chassis of the information handling system. As described herein, the enclosed ion emitter cooling system 354 may be placed near heat generating hardware such as a processing device (e.g., CPU, processor, GPU, etc.). In an embodiment, the heat transfer device 364 of the enclosed ion emitter cooling system 354 may be thermally coupled to the heat generating hardware.

Figure 4:
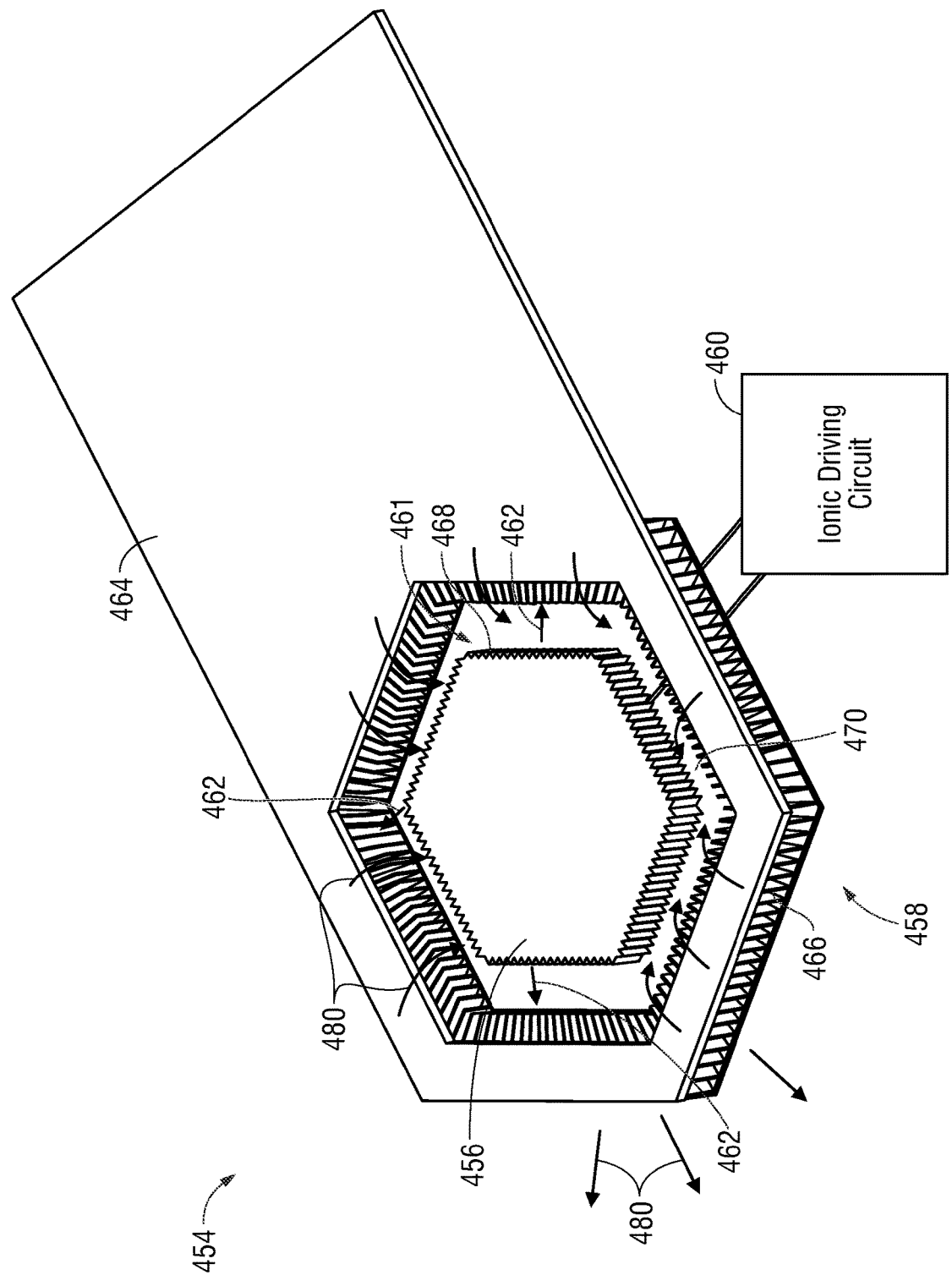
FIG. 4 is a graphic, perspective view diagram of an enclosed ion emitter cooling system of an information handling system according to another embodiment of the present disclosure.

FIG. 4 is a graphic, perspective view diagram of cooling system 454 of an information handling system according to another embodiment of the present disclosure. The example embodiment shown in FIG. 4 includes an ion emitter hub 456 placed within an ion collector ring 458. In comparison to FIG. 2, for example, the ion emitter hub 456 of FIG. 4 is in a prism hexagonal shape. Additionally, the ion collector ring 458 in FIG. 4 is also in a hexagon shape that follows the shape of the sides of the ion emitter hub 456. FIG. 4 is meant to illustrate that the enclosed ion emitter cooling system 454 may be any shape includes any of a polygon, oval, rounded, or irregular shape including different shapes between the ion emitter hub 456 and ion collector ring 458 in various embodiments.

In this embodiment, as described herein, the ion emitter hub 456 operates as the portion of the enclosed ion emitter cooling system 454 that strips electrons from atoms in the air to create ions within the atmosphere between the ion emitter hub 456 and ion collector ring 458. As described herein, the ion emitter hub 456 may be operatively coupled to a first electrode (e.g., a positive electrode) of a high voltage source of the ionic driving circuit 460 and the ion collector ring 458 may be operatively coupled to a second electrode (e.g., negative electrode) of the high voltage source of the ionic driving circuit 460. In an embodiment, the ion collector ring 458 may be operatively coupled to a grounding source of the high voltage source of the ionic driving circuit 460. In these embodiments, when the high voltage source is operated, an electric field is created between the ion emitter hub 456 and the ion collector ring 458 allowing for a repulsive and attractive force to be applied to the ions created as described herein. In various embodiments, the ion emitter control system executing on a hardware processing resource may selectively turn on or turn off the operation of the enclosed ion emitter cooling system 454. The execution of the ion emitter control system executing on a hardware processing resource may turn on the enclosed ion emitter cooling system 454 when a temperature threshold associated with hardware within the information handling system is reached or when other factors indicate that the enclosed ion emitter cooling system 454 is to be turned on. In another embodiment, ion emitter control system executing on a hardware processing resource may selectively turn on or turn off the operation of the enclosed ion emitter cooling system 454 when other factors indicate that the enclosed ion emitter cooling system 454 is to be turned on such as consumption of processing resources, charging or discharging of a battery, or operation of a hard-disk drive (HDD), among other factors that describe hardware operations that may produce heat within the housing of the information handling system.

The ion emitter hub 456, in an embodiment, includes one or more hub protrusions 468 that extend out from a central portion of the ion emitter hub 456. In an embodiment, these hub protrusions 468 may include an edge that facilitates generation of ions within the atmospheric air when a high voltage source, operatively coupled to the ion emitter hub 456, provides a high voltage (e.g., 2V to 10V). In an embodiment, the hub protrusions 468 may include a sharp edge with the sharp edge running along a height of the ion emitter hub 456. This allows for multiple points around the ion emitter hub 456 to be used to strip electrons from the atoms in the air to create ions within the enclosed ion emitter cooling system 454. In an embodiment, the ions may be generated radially, 360 degrees, out from the ion emitter hub 456. As described herein, the ions generated by the ion emitter hub 456 are repelled from the ion emitter hub 456 and drawn toward the ion collector ring 458 as a result of the electromagnetic repulsion of the ion emitter hub 456 to the positively-charged ions and the electromagnetic attraction of the ion collector ring 458 to those positively-charged ions. In this embodiment, a positive electrode of the high voltage source of the ionic driving circuit 460 is operatively coupled to the ion emitter hub 456 while a negative electrode is operatively coupled to the ion collector ring 458. The movement of these positively-charged ions within the air in the enclosed ion emitter cooling system 454 causes a shearing force to be applied to other gas atoms and molecules in atmosphere (either ionized or not) thereby creating the airflow 462 from the ion emitter hub 456 and towards the ion collector ring 458 (e.g., described herein as a first direction of airflow 462). This airflow 462 generates additional airflow 480 that is represented in FIG. 4 by downturn arrows that show an airflow 480 entering into an aperture 461 formed by an opening in the ion collector ring 458. When the positively-charged ions reach the ion collector ring 458, the positively-charged ions are deionized because the ion collector ring 458 is operating as an ion deionizer/collector by being operatively coupled to ground or the negative electrode of the high voltage source of the ionic driving circuit 460. The airflow 480 generated from inertia created by the ions and airflow 462 may continue through thermal fins 466 of the ion collector ring 458 and out from the enclosed ion emitter cooling system 454 as indicated by straight arrows radiating from the outer side of the ion collector ring 458.

In an embodiment, the ion collector ring 458 includes one or more thermal fins 466. As shown in FIG. 4, the thermal fins 466 may extend past an outer edge of the top aperture 461 of the ion collector ring 458 such that the ion collector ring 458 may not cover a portion of these thermal fins 466. FIG. 4 shows that the distance between the ion collector ring 458 and ion emitter hub 456 may be reduced by extending the thermal fins 466 towards the ion emitter hub 456 to decrease distance for better ion emitter-collector interaction and, in some example embodiments, may reduce the necessary voltage needed to ionize the air near the ion emitter hub 456.

During operation, the thermal fins 466 may be used to dissipate heat from the heat-generating components into the airflow 480 (e.g., the first direction of airflow as described herein) as it passes through the ion collector ring 458. The thermal fins 466, in an embodiment, may be located near a venting port formed into a housing of the information handling system so that the airflow 480 may exit the housing of the information handling system in some embodiments resulting in the cooling of the hardware within the housing of the information handling system.

As described herein, the enclosed ion emitter cooling system 454 may be placed near heat generating hardware such as a processing device (e.g., CPU, processor, GPU, etc.) located within in a base chassis of the information handling system. In an embodiment, the heat transfer device 464 of the enclosed ion emitter cooling system 454 may be thermally coupled to the heat generating hardware. In the example embodiment of a laptop-type information handling system, the top intake aperture 461 may be housed within the base chassis while an outer surface of the ion collector ring 458 may be placed next to an outlet vent formed in the c-cover, d-cover, or a combination thereof of the base chassis. In another embodiment, the top intake aperture 461 may be placed adjacent to an inlet vent formed in the base chassis of the information handling system (e.g., the c-cover, d-cover or a combination thereof) to draw air into the base chassis of the information handling system, pass through the intake aperture 461, between the ion emitter hub 456 and ion collector ring 458, and out of an outlet vent formed at a different location along the housing of the base chassis (e.g., c-cover, d-cover, or a combination thereof).

As described in an embodiment herein, the ion collector ring 458 may operate as an ion emitter instead while the ion emitter hub 456 operates as an ion collector/deionizer. In this embodiment, the thermal fins 466 may be used to strip electrons from atoms in the air within the enclosed ion emitter cooling system 454 to form ions within the atmosphere in the enclosed ion emitter cooling system 454. As a result of this example operation of the ion collector ring 458 becomes an ion emitter ring and ion emitter hub 456 becomes an ion collector hub, the ions generated at the edges of the thermal fins 466 of the ion emitter ring 458 are repelled from the ion emitter ring 458 and attracted to the ion collector hub 456 as a result of the created electric field created between the ion collector hub 456 and ion emitter ring 458. The movement of these positively-charged ions within the air in the enclosed ion emitter cooling system 454 causes a shearing force to be applied to other gas atoms and molecules in atmosphere thereby creating the airflow 462 from the ion emitter ring 458 towards the ion collector hub 456 (e.g., a second, reverse direction of airflow as described herein). When the positively-charged ions reach the ion collector hub 456, the positively-charged ions are deionized because the ion emitter hub 456 is operating as an ion deionizer/collector by being operatively coupled to ground or a negative electrode of the high voltage source of the ionic driving circuit 460 as described herein. The reverse airflow (not shown) created in this example embodiment may be opposite of the airflow 480 as shown in FIG. 4. This allows, in an embodiment, for the created airflow (e.g., a second direction of airflow) to dislodge dust or other contaminates on or about the enclosed ion emitter cooling system 454 in a cleaning process. In other embodiments, the top aperture 461 may operate as an outlet and be operatively coupled to a heat outlet vent in an information handling system chassis. In order to form the ions at the thermal fins 466 so as to create this reverse airflow direction, each of the thermal fins 466 may have edges that facilitate the stripping of electrons from atoms in the air. In an embodiment, the edges of the thermal fins 466 may include a sharp edge that extends along the height of the ion collector ring 458.

In this example embodiment for a laptop-type information handling system, the top outlet aperture 461 may be placed next to an outlet vent formed in the c-cover, d-cover, or a combination thereof of the base chassis with a reversed airflow. An outer surface of the ion collector ring 458 may be housed within the base chassis to pull air from the body of the base chassis and a remote air inlet. In another embodiment, outer surface of the ion collector ring 458 may be housed near an air inlet vent while the top outlet aperture 461 may be placed adjacent to an outlet vent formed in the base chassis of the information handling system (e.g., the c-cover, d-cover or a combination thereof). Thus, the enclosed ion emitter cooling system may draw air into the base chassis of the information handling system, pass through the ion emitter ring 458, between the ion emitter ring 458 and the ion collector hub 456, and out of outlet aperture 461 and an outlet vent formed at a surface of the housing of the base chassis (e.g., c-cover, d-cover, or a combination thereof).

The ion emitter control system executing on a hardware processing resource may selectively turn on or turn off the operation of the enclosed ion emitter cooling system 454 and may turn on the enclosed ion emitter cooling system 454 when a temperature threshold associated with hardware within the information handling system is reached or when other factors indicate that the enclosed ion emitter cooling system 454 is to be turned on. In another embodiment, ion emitter control system executing on a hardware processing resource may selectively turn on or turn off the operation of the enclosed ion emitter cooling system 454 when other factors indicate that the enclosed ion emitter cooling system 454 is to be turned on such as consumption of processing resources, charging or discharging of a battery, or operation of a hard-disk drive (HDD), among other factors that describe hardware operations that may produce heat within the housing of the information handling system. In another embodiment, ion emitter control system executing on a hardware processing resource may selectively turn on or turn off the operation of the enclosed ion emitter cooling system 454 to generate the reverse airflow to conduct the cleaning process used to dislodge dust or other contaminants within the housing of the information handling system. In embodiments where thermal exhaust vents are formed into the d-cover of the base chassis for airflow to pass out of the housing of the information handling system, the operation of the enclosed ion emitter cooling system 454 allows the airflow to be directed downward from the base chassis where other fan systems, for example, cannot generate such an airflow due to their configurations.

In an embodiment, the enclosed ion emitter cooling system 454 includes an electrically insulative substrate 470 that is operatively coupled to the ion emitter hub 456 and ion collector ring 458. The electrically insulative substrate 470 operatively orients the ion emitter hub 456 relative the ion collector ring 458 but electrically insulates the ion emitter hub 456 and ion collector ring 458 from one another. The electrically insulative substrate 470, therefore, provides a substrate onto which, at least, the ion emitter hub 456 may be oriented near the ion collector ring 458 (e.g., 5 mm to 10 mm apart) but allows for the electrical field to be created between the ion emitter hub 456 and the ion collector ring 458. In an embodiment, the positive electrode associated with the high voltage source of the ionic driving circuit 460 may be operatively coupled to the ion emitter hub 456 via a hole formed into the electrically insulative substrate 470. In an embodiment, the negative electrode associated with the high voltage source of the ionic driving circuit 460 may be operatively coupled to the ion collector ring 458 via another hole formed in the electrically insulative substrate 470.

As described herein, the enclosed ion emitter cooling system 454 may include a heat transfer device 464 that is a passive cooling system operatively coupled to, at least, the ion collector ring 458 and, in another embodiment, to the ion emitter hub 456. In the example embodiment shown in FIG. 4, the heat transfer device 464 is a vapor chamber. A vapor chamber, in an example embodiment, may include a tubular and sealed pipe with a working fluid therein. As the vapor chamber receives heat from a source such as a radio module, a central processing unit (CPU), a graphical processing device (GPU), other processing devices, and the like, the working fluid may absorb that heat and move from one state to another (e.g., liquid state into a gas state) as the temperature changes. Heat received in the vapor chamber may be dumped at the enclosed ion emitter cooling system 454 described herein. The present specification further contemplates that other passive cooling systems may be used instead of or in addition to the vapor chamber shown in FIG. 4. These other passive cooling systems includes thermal fins, heat sinks, and heatpipes, among others. In the example embodiment shown in FIG. 4, this vapor chamber may form a top portion of the ion collector ring 458 so that the airflow 480 passing into or out of the top aperture 461 formed by the ion collector ring 458 may pass over the vapor chamber, get heated, pass through the ion collector ring 458 and out from the housing of the information handling system. It is appreciated that the top aperture 461 as shown in FIG. 4 can be any orientation such that air is drawn into the aperture 461 and out of the thermal fins 466 of the enclosed ion emitter cooling system 454. In an embodiment, any surface of the heat transfer device 464 may heat the air that is removed from within the housing of the information handling system via operation of the enclosed ion emitter cooling system 454 described in connection with FIG. 4.

Figure 5:
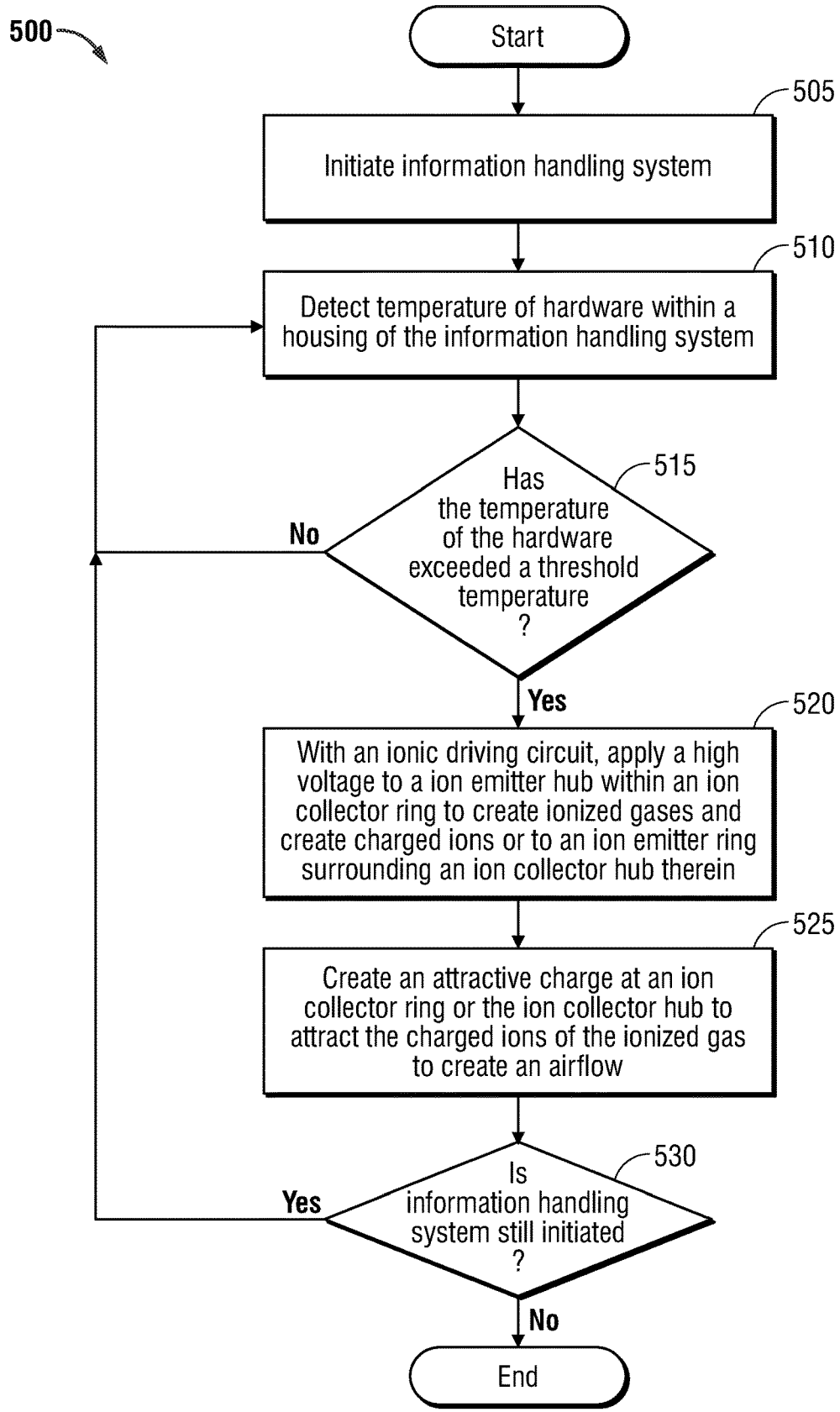
FIG. 5 is a flow diagram of a method of operating an enclosed ion emitter cooling system of an information handling system according to an embodiment of the present disclosure.

FIG. 5 is a flow diagram of a method 500 of operating an enclosed ion emitter cooling system of an information handling system according to an embodiment of the present disclosure. The enclosed ion emitter cooling system described herein may operate with other cooling systems (either passive or active) placed within a housing of the information handling system such as a heat pipe, a set of thermal fins, and/or a vapor tube, among other types of cooling systems. As described in FIGS. 2, 3, and 4, an example cooling system that may be operatively coupled to the enclosed ion emitter cooling system described herein is a vapor chamber a heat pipe, a cold plate, a heat sink, or other passive cooling systems. A vapor chamber, in an example embodiment, may include a tubular and sealed pipe with a working fluid therein. As the vapor chamber receives heat from a source such as a radio module, a central processing unit (CPU), a graphical processing device (GPU), other processing devices, and the like, the working fluid may absorb that heat and move from one state to another (e.g., liquid state into a gas state) as the temperature changes. Heat received in the vapor chamber may be dumped at the enclosed ion emitter cooling system described herein.

The method 500 includes, at block 505 with initiating the information handling system. This initiation process may be conducted by the user actuating, for example, a power key on the information handling system. The actuation of this power key may cause the execution of a native BIOS, a native OS, or other code instructions used and executed by the processor of the information handling system to operate the hardware within the information handling system including the enclosed ion emitter cooling system described herein. In an embodiment, the initiation of the information handling system may further include an initiation of a hardware controller, a PMU controller, or hardware processor to execute code instructions of an ion emitter control system to control an ionic driving circuit for the enclosed ion emitter cooling system described herein.

At block 510, the temperature of the hardware within the housing of the information handling system may be detected. In an embodiment, the temperature of the hardware that is detected may be detected using a temperature sensor coupled to one or more hardware devices such as the hardware processor, PMU controller, or other hardware processing resource, battery, or video display device, for example, of the information handling system among other hardware devices. Other example embodiments may include a processing management system that measures the processing resources consumed by any type of processing device and calculates an interior temperature of the housing of the information handling system. The temperature sensor such as a thermistor may report a temperature of the information handling system (e.g., a specific hardware device or a temperature in a housing of the information handling system) to the ion emitter control system.

At block 515, the method 500 may include determining if the temperature of the hardware exceeded a threshold temperature with the ion emitter control system. The activation of any other active cooling systems within the housing of the information as well as the enclosed ion emitter cooling system described herein with the ion emitter/collector hub and ion collector/emitter ring may depend on whether a threshold temperature has been reached. In another example embodiment, the process of determining if the threshold temperature has been achieved may determine whether to increase or decrease voltage difference applied between the ion emitter/collector hub and ion collector/emitter ring that may increase and decrease the generation of ions to create, respectively, stronger or weaker airflow. Where the threshold temperature has not been reached at block 515, the method 500 may continue to block 510 again to detect the temperature of the hardware within the housing of the information handling system.

In an embodiment, the activation of the ionic driving circuit to create ions at the ion emitter hub, such as at the hub protrusions, is activated when a first temperature threshold is reached as illustrated with FIG. 2. In another embodiment, the activation of the ionic driving circuit to create ions at the thermal fins of the ion emitter ring when a first temperature threshold is reached as illustrated with FIG. 3. Where that first temperature threshold is not reached the enclosed ion emitter cooling system is not activated and the operation of the information handling system continues, in an embodiment, without the cooling of the hardware within the information handling system.

Where the first temperature threshold is reached (e.g., 40° C.), the activation of the ionic driving circuit causes the charged ions to be created at the thermal fins of the ion collector/emitter ring or the hub protrusions of the ion emitter/collector hub (depending on the operational status of the ion emitter/collector hub and ion collector/emitter ring). Migration of these ions along an electric field between the emitter structure and collector structure causes the creation of airflow within the ion emitter fan housing via the shear forces of the ions moving surrounding air from one of the ion emitter hub or ion emitter ring to the other of the ion collector ring or ion collector hub as described in embodiments herein. In an embodiment, at block 515, a second temperature threshold may also be detected. This second threshold temperature may be set to a temperature higher than the temperature of the first temperature threshold. Where this second temperature threshold (e.g., 45° C.) is reached, the enclosed ion emitter cooling system may be used to increase the voltage difference applied between the ion emitter/collector hub and ion collector/emitter ring. In other embodiments, the second temperature threshold may determine an activation of other active cooling systems in an information handling system such as a fan within the information handling system, but activation of such a fan and its noise may be postponed by the use of the quiet enclosed ion emitter cooling system of embodiments of the present disclosure. Additional temperature thresholds may also be monitored by the ion emitter control system for (e.g., temperatures above those temperatures associated with the first and second temperature thresholds) that cause the voltage difference between the ion emitter/collector hub and ion collector/emitter ring to be increased in order to create a stronger airflow through the ion emitter fan housing via the creation of more ions. It is appreciated, in some embodiments, that the activation of the ionic driving circuit to create charged ions at the ion emitter/collector hub or ion collector/emitter ring may be completed when the second temperature threshold is reached while the increase in voltage difference is initiated when the first temperature threshold is reached in another embodiment. The selective activation of the ionic driving circuit to create charged ions at the ion emitter/collector hub or ion collector/emitter ring at the first temperature threshold and the increase in voltage difference or for activation of other active cooling system such as a blower fan allows for a two-stepped or multi-step cooling process. This two-stepped or multi-step cooling process with the enclosed ion emitter cooling system provides for at least silent cooling of the hardware within the housing of the information handling system to be extended in some embodiments.

Where a threshold temperature (e.g., first temperature threshold or second threshold) has been reached at block 515, the method 500 may continue to block 520 with apply a high voltage to an ion emitter hub within an ion collector ring to create ionized gases and create charged ions therein. In an embodiment, the ionic driving circuit is controlled via the hardware processor of the information handling system, a controller associated with the PMU of the information handling system, other hardware processing resources, or a combination thereof executing firmware or software of the ion emitter control system. The ionic driving circuit, in an embodiment, includes a high voltage source that is operatively coupled to the ion emitter/collector hub or ion collector/emitter ring depending on the operation of each of these devices as described herein. The high voltage source of the ionic driving circuit causes, in an embodiment, the ion emitter hub to generate and repel ions from the edges, points, or other surfaces formed on the ion emitter hub. In the context of the present specification, the term "emit" or "emitter" is meant to describe an action and device that, at its edges, creates/generates ions and, via an electromagnetic repulsion, repels those ions towards an oppositely charged source such as the ion collector ring described herein. In an embodiment, the high voltage source of the ionic driving circuit causes electrons to be stripped from gas atoms near the enclosed ion emitter cooling system causing those gases to be ionized. This ionization process may include the removal of one or more electrons to the outer valence shells of the individual atoms within the gas such that they become positively charged (e.g., cation). In an example where the space between the ion emitter hub and ion collector ring includes atmospheric air, any number of types of gas atoms may be subjected to this process. For example, where the gas includes oxygen (O), the ionization of oxygen may include the removal of a single electron or two electrons to the outermost valence electron shell. This may lead to a $O^+$ or $O^{2+}$ ion (e.g., cations) being created by the ion emitter fan and ionic driving circuit in an embodiment. Other gas atoms within the atmosphere within the ion emitter fan housing may similarly be ionized.

This ionization of the atmospheric gases between the ion emitter hub and ion collector ring helps to cause an airflow within the enclosed ion emitter cooling system and drawing in heated air from within the housing of the information handling system via, for example, an intake hole or aperture above the ion emitter hub. In an embodiment, the movement of the positively-charged ions creates a shearing force against other atoms or molecules within the air (ionized or not) thereby creating the airflow described herein. In an embodiment, a top intake aperture of the enclosed ion emitter cooling system may be housed within the base chassis while an outer surface of the ion collector ring may be placed next to an outlet vent formed in the c-cover, d-cover, or a combination thereof of the base chassis. In another embodiment, the top intake aperture may be placed adjacent to an inlet vent formed in the base chassis of the information handling system (e.g., the c-cover, d-cover or a combination thereof) to draw air into the base chassis of the information handling system, pass through the intake aperture, between the ion emitter hub and ion collector ring, and out of an outlet vent formed at a different location along the housing of the base chassis (e.g., c-cover, d-cover, or a combination thereof).

As described herein, the present specification contemplates in another embodiment that the ion emitter ring (e.g., operatively coupled to a positive electrode of the high voltage source) may be the device that creates or generates the ions while the ion collector hub (e.g., operatively coupled to a negative electrode of the high voltage source) is the device that attracts and deionizes those ions. In such an embodiment, a top aperture of the enclosed ion emitter cooling system may be an outlet aperture and housed within the base chassis along an outer surface of the information handling system chassis. The ion collector ring may be placed, in some embodiments, next to an inlet vent to draw cool air into the information handling system chassis when a reverse airflow is generated by the enclosed ion emitter cooling system, for example the system shown in FIG. 3. In an embodiment, the top outlet aperture may be placed adjacent to an outlet vent formed in a flat surface side the base chassis of the information handling system (e.g., the c-cover, d-cover or a combination thereof) to exhaust air from the base chassis of the information handling system according to embodiments herein. In embodiments where thermal exhaust vents are formed into the d-cover of the base chassis for airflow to pass out of the housing of the information handling system, the operation of the enclosed ion emitter cooling system allows the airflow to be directed downward from the base chassis where other fan systems, for example, cannot do so due to their configurations. Consequently, the present method contemplates that a similar method may be applied to the situation where the ion emitter ring creates the ions to, for example, create an airflow used to dislodge dust or other contaminants on or near the enclosed ion emitter cooling system.

In an embodiment, the movement of the ions created and emitted from the ion emitter hub, in an embodiment, may be from the ion emitter hub to the ion collector ring at block 525. In an embodiment, an attractive charge, for example, at an ion collector ring is used to attract the charged ions of the ionized gas near the ion collector ring to create an airflow at block 525. In an example embodiment, the ion emitter hub may be operatively coupled to a positive electrode of the high voltage source of the ionic driving circuit. As a result of creating the positively-charged ions, the ion emitter hub now repels those positively-charged ions. Additionally, in an embodiment, the ion collector ring is operatively coupled to the negative electrode of the high voltage source of the ionic driving circuit. This causes the positively-charged ions created by the ion emitter hub to be attracted to the ion collector ring further causing movement of the ions and creating an airflow through the enclosed ion emitter cooling system. As the positively-charged ions reach the ion collector ring, those valence electrons removed from the ions by the ion emitter hub may be replaced thereby placing those gases at a neutral electrical charge again. Following the example of the ionization of the oxygen atoms in the atmospheric gases within near the ion emitter hub by the ion emitter hub, as these $O^+$ or $O^{2+}$ ions have their valence electron shells (e.g., a single electron or two electrons, respectively) replenished, they are placed in the electrically neutral state. As described herein, the creation of anions by the ion emitter fan and neutralization of those anions by the ion collector is also anticipated.

Again, as described herein, the ion collector hub, instead of operating as in ion emitter as shown in FIG. 2, may operate as an ion collector to receive and deionize ions generated and emitted by the ion emitter ring now, in an embodiment, operating as an ion emitter. As described herein, this allows the enclosed ion emitter cooling system to create an airflow in an opposite direction than the airflow as shown in FIG. 2. In an example embodiment, the ion collector ring may be operatively coupled to a positive electrode of the high voltage source of the ionic driving circuit. As a result of creating the positively-charged ions, the ion emitter ring now repels those positively-charged ions. Additionally, in an embodiment, the ion collector hub is operatively coupled to the negative electrode of the high voltage source of the ionic driving circuit. This causes the positively-charged ions created by the ion emitter ring to be attracted to the ion collector hub further causing movement of the ions and creating an airflow through the enclosed ion emitter cooling system. As the positively-charged ions reach the ion collector hub, those valence electrons removed from the ions by the ion emitter ring may be replaced thereby placing those gases at a neutral electrical charge again. Following the example of the ionization of the oxygen atoms in the atmospheric gases within near the ion emitter hub by the ion emitter hub, as these $O^+$ or $O^{2+}$ ions have their valence electron shells (e.g., a single electron or two electrons, respectively) replenished, they are placed in the electrically neutral state.

The method 500 includes determining, at block 530, whether the information handling system is still initiated. Where the information handling system is no longer initiated (e.g., power has been removed from the information handling system via actuation of a power button), the method 500 may end here. Where the information handling system is still initiated, the method 500 may continue to block 510 as described herein.

The blocks of the flow diagrams of FIG. 5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a processor;
   a memory device;
   a power management unit (PMU) to provide power to the processor and memory device;
   an enclosed ion emitter cooling system including an ion emitter hub with hub protrusions that extend out from a central portion of the ion emitter hob and an ion collector ring of a plurality of circularly arranged collector fins surrounding the ion emitter hub;
   the processor executing code instructions of an ion emitter control system to activate an ionic driving circuit; and
   the ionic driving circuit operatively coupled to:
      the ion emitter hub and applying a first voltage to produce and repel ionized gases at the ion emitter hub; and
      the ion collector ring and applying a second voltage to attract and deionize those ionized gases,
   wherein movement of the ionized gases from the ion emitter hub to the ion collector ring causes an airflow within the enclosed ion emitter cooling system.

2. The information handling system of claim 1 further comprising:
   the ion collector ring formed at an external opening of the cooling system to provide a deionization source for the ionized gases in a polygonal ion collector ring.

3. The information handling system of claim 1 further comprising:
   the ion collector ring includes the plurality of circularly arranged collector fins that are a plurality of thermal fins to dissipate heat from information handling system components into air drawn into the enclosed ion emitter cooling system via the created airflow.

4. The information handling system of claim 1 further comprising:
the hub protrusions on the ion emitter hub shaped for one or more electron source points to facilitate generation of the ions.

5. The information handling system of claim 1 further comprising:
the ion collector ring operatively coupled to a heat pipe with the heat pipe being coupled to a processing device of the information handling system.

6. The information handling system of claim 1 further comprising:
the ion collector ring thermally coupled to a vapor chamber to conduct heat into the ion collector ring to allow air to flow past the ion emitter hub and through ion collector ring via the movement of the ionized gases to cool the ion collector ring.

7. The information handling system of claim 1 further comprising:
an air intake vent of the information handling system positioned above the ion emitter hub to draw air into the ion emitter hub and through to the ion collector ring via the airflow.

8. The information handling system of claim 1 further comprising:
an insulative layer positioned below the ion collector ring and ion emitter hub, wherein the ion collector ring and ion emitter hub are coupled to the insulative layer to maintain the location of the ion emitter hub relative to the ion collector ring.

9. An enclosed ion emitter cooling system for an information handling system comprising:
the enclosed ion emitter cooling system including an ion collector hub and an ion emitter ring surrounding the ion collector hub; and
an ionic driving circuit operatively coupled to a hardware controller executing code instructions of an ion emitter control system to:
apply a first voltage at the ion emitter ring to produce and repel ionized gases at the internal edges of the ion emitter ring;
apply a second voltage at the ion collector hub to attract and deionize those ionized gases,
wherein movement of the ionized gases from the ion emitter ring to the ion collector hub causes an airflow out of the enclosed ion emitter cooling system through an aperture at the ion collector hub.

10. The enclosed ion emitter cooling system of claim 9 further comprising:
the ion collector hub formed at an external opening of the enclosed ion emitter cooling system to provide a deionization source for the ionized gases and an outlet for airflow to a heat exhaust vent of an information handling system.

11. The enclosed ion emitter cooling system of claim 9 further comprising:
the ion emitter ring comprising a plurality of thermal fins to dissipate heat from heated air drawn into the cooling system via the airflow.

12. The enclosed ion emitter cooling system of claim 9 further comprising:
the internal edges on the ion emitter ring having sharp edges that create one or more electron source points to facilitate creation of ions.

13. The enclosed ion emitter cooling system of claim 9 further comprising:
the ion emitter ring operatively coupled to a heat pipe with the heat pipe being thermally coupled to a processing device of the information handling system to dissipate heat from the processing device.

14. The enclosed ion emitter cooling system of claim 9 further comprising:
the ion emitter ring thermally coupled to a vapor chamber to conduct heat into the ion emitter ring to allow air to flow through the ion emitter ring via the movement of the ionized gases that creates the airflow within the cooling system to dissipate heat from the information handling system.

15. The enclosed ion emitter cooling system of claim 9 wherein the ionic driving circuit applies a grounding source as the second voltage at the ion collector hub to provide a voltage potential difference between the ion emitter ring and ion collector hub.

16. The enclosed ion emitter cooling system of claim 9 further comprising:
an air intake around and edge of the ion emitter ring to draw air in between thermal fins of the ion emitter ring and out from an air outlet aperture positioned at the ion collector hub.

17. A method of operating an enclosed ion emitter cooling system of an information handling system comprising:
with an ionic driving circuit, applying a first voltage from a voltage source to an ion emitter hub with hub protrusions that extend out from a central portion of the ion emitter hub placed within an ion collector ring-to create ionized gases and to produce and repel ionized gases at the ion emitter hub; and
with the ionic driving circuit, applying a second voltage to create a voltage potential difference between the ion emitter hub and the ion collector ring formed of a plurality of circularly arranged collector fins to attract the ionized gases towards the ion collector ring, the ionized gases to be deionized at the ion collector ring, where the movement of the ionized gases from the ion emitter hub to the ion collector ring creates a sheer force against the air between the ion emitter hub and the ion collector ring to create an airflow within the enclosed ion emitter cooling system to draw air into an inlet aperture and out through the ion collector ring and across the plurality of circularly arranged collector fins.

18. The method of claim 17 further comprising:
the ion collector ring comprising the plurality of circularly arranged collector fins that are a plurality of thermal fins to dissipate heat into the air drawn into the cooling system in the inlet aperture via the airflow when air moves out across the plurality of circularly arranged collector fins, wherein the inlet aperture is placed at an external opening of the information handling system to draw air in from within a housing of the information handling system.

19. The method of claim 18 further comprising:
the edges of hub protrusions of the ion emitter hub including sharpened edges that create one or more electron source points used to facilitate creation of ions at the ion emitter hub.

20. The method of claim 17 further comprising:
conducting heat from a vapor chamber thermally coupled to the ion collector ring by allowing air to flow pass through the ion collector ring via the movement of the ionized gases creating the airflow.

* * * * *